ns009049432B1

(12) United States Patent
Pearlman et al.

(10) Patent No.: US 9,049,432 B1
(45) Date of Patent: Jun. 2, 2015

(54) MOTION DIFFERENTIAL SET PARTITION CODING FOR COLOR IMAGE SEQUENCE COMPRESSION

(71) Applicant: PrimaComp, Inc., Niskayuna, NY (US)

(72) Inventors: William Abraham Pearlman, Niskayuna, NY (US); Yang Hu, Milpitas, CA (US)

(73) Assignee: PrimaComp, Inc., Niskayuna, NY (US)

( * ) Notice: Subject to any disclaimer, the term of this patent is extended or adjusted under 35 U.S.C. 154(b) by 0 days.

(21) Appl. No.: 14/324,078

(22) Filed: Jul. 4, 2014

(51) Int. Cl.
  *H04N 19/103* (2014.01)
  *H04N 19/63* (2014.01)
  *H04N 19/186* (2014.01)
  *H04N 19/593* (2014.01)

(52) U.S. Cl.
  CPC ... *H04N 19/00818* (2013.01); *H04N 19/00315* (2013.01); *H04N 19/00763* (2013.01)

(58) Field of Classification Search
  None
  See application file for complete search history.

(56) References Cited

U.S. PATENT DOCUMENTS

| | | | |
|---|---|---|---|
| 5,764,807 A | 6/1998 | Pearlman et al. | |
| 6,674,911 B1 | 1/2004 | Pearlman et al. | |
| 2004/0028138 A1* | 2/2004 | Piche et al. | 375/240.19 |
| 2004/0170335 A1* | 9/2004 | Pearlman et al. | 382/240 |
| 2008/0031344 A1* | 2/2008 | Lu et al. | 375/240.19 |
| 2008/0266151 A1* | 10/2008 | Sankaran | 341/107 |
| 2011/0317929 A1* | 12/2011 | Takada | 382/232 |
| 2014/0064365 A1* | 3/2014 | Wang et al. | 375/240.12 |

OTHER PUBLICATIONS

Hu et al., "Motion Differential Set Partition Coding for Image Sequence and Video Compression", J. Vis. Commun. Image R. 23 (2012), pp. 634-641.
William A. Pearlman; Wavelet Image Compression "Synthesis Lectures on Image, Video, and Multimedia Processing", 2013, pp. 1-90.
Pearlman et al., "Set Partition Coding: Part I of Set Partition Coding and Image Wavelet Coding Systems, Foundations and Trends in Signal Processing", vol. 2, No. 2 (2008), pp. 95-180.

* cited by examiner

*Primary Examiner* — Hung Dang
*Assistant Examiner* — Sunghyoun Park

(57) ABSTRACT

A method, computer system, and a computer program product is disclosed for encoding a sequence of color frames. The method includes a processor obtaining a sequence of color frames and rendering a first frame of the sequence in at least three components, each component representing a different color value. For each of the at least three components, the processor performs a wavelet transform on the first frame, initializes a significant points list and a list of insignificant sets to create an individual spatial tree of the list of insignificant sets for each component, searches all of the at least three components to identify a most significant bit in the first frame, and creates a consolidated significance map with all the color components for the first frame by searching the individual spatial tree for each component. The processor then obtains this significance map and utilizes the significance map to encode the first frame. The processor retains the significance map in memory as a key frame significance map and retains the first frame, or a color transform of the first frame, in memory, as a key frame.

20 Claims, 11 Drawing Sheets

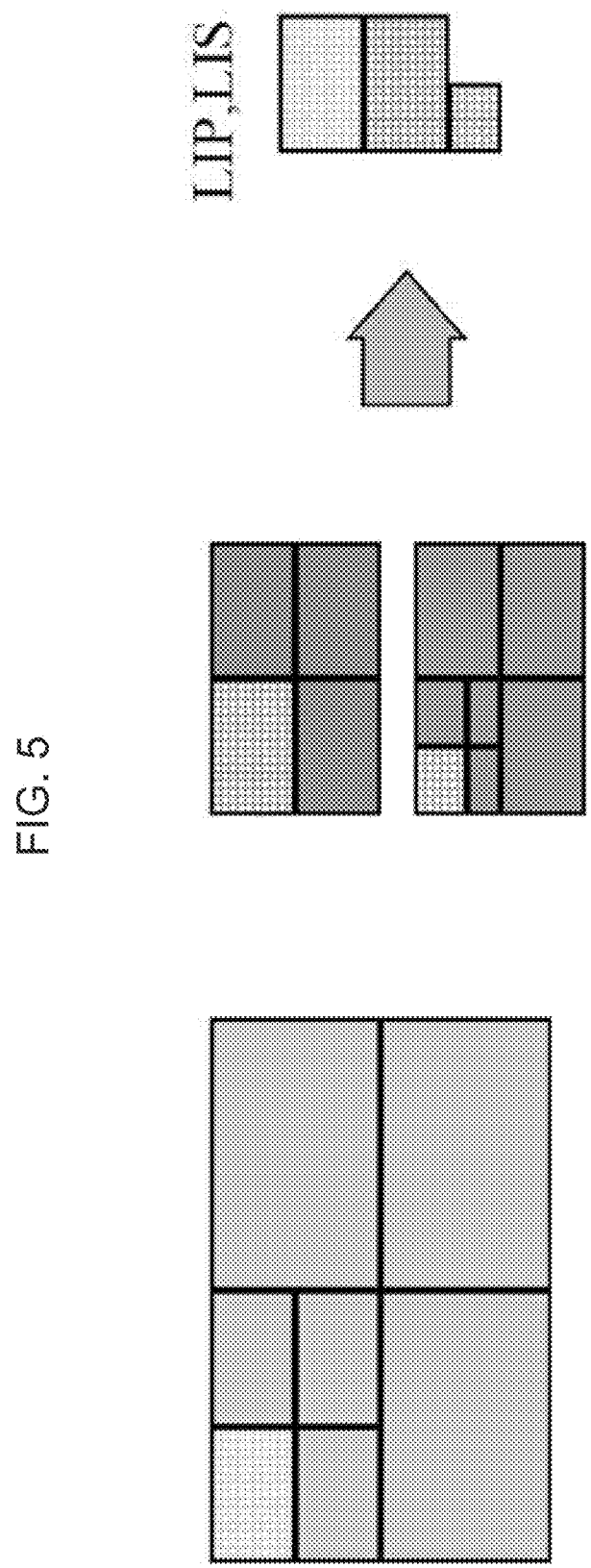

MOTION DIFFERENTIAL SET PARTITION CODING FOR COLOR IMAGE SEQUENCE COMPRESSION

FIELD OF INVENTION

The present invention relates to an apparatus and method of efficient image sequence coding that exploits inter-frame correlation to achieve higher coding efficiency in coding color frame sequences, including but not limited to, color video, and maintains the beneficial features of all-intra-coding such as computational simplicity, parallel processing, no error-propagation between frames, and random frame access.

BACKGROUND OF INVENTION

Image sequence coding achieves high efficiency by exploiting both spatial (intra-frame) and temporal (inter-frame) correlations. Set partition coding (SPC) is an efficient means for encoding transforms of datasets, regardless of dimension, and exploits well correlations within and among image frames. SPC has served as an auxiliary component to the coding efficiency of wavelet-based approaches in two dimensions, including Embedded Zerotree Wavelet (EZW), the JPEG 2000 image compression standard, and even the 2D lossy-to-lossless compression algorithm recently standardized by the Consultative Committee for Space Data Systems (CCSDS). SPC has also been successfully applied into several other well-known image coding algorithms including, but not limited to Set Partitioning in Hierarchical Trees (SPIHT), Set-Partitioning Embedded Block (SPECK), SWEET, Subband Block Hierarchial Partitioning (SBHP), and Embedded Zero Block Coding (EZBC). Set Partition Coding (SPC), in combination with other entropy coding methods, such as arithmetic coding, takes advantage of the beneficial localization properties of wavelet transforms to achieve competitive rate-distortion performance.

There are two main approaches for exploiting temporal correlation (an advantage of SPC): 1) inter-frame prediction; and 2) three-dimensional (3D) decomposition. However, inter-frame prediction with motion compensation is the more computationally intensive, although it is widely used in the MPEGx and H.26x video coding standards. But when used with motion estimation and compensation, reconstruction at the encoder side can be highly complex. One reason is that the inter-coding framework prohibits random frame access, which is an important feature for post-production editing applications. Thus, to overcome these drawbacks, intra coding is used for every frame of an image sequence, such as in motion JPEG 2000. The current standard for digital cinema distribution requires that every frame is coded independently with JPEG 2000. But this method, as well as all intra-coding methods, sacrifices coding efficiency to some extent due to the unexploited inter-frame correlation.

SUMMARY OF INVENTION

Shortcomings of the prior art are overcome and additional advantages are provided through the provision of method of efficient image sequence coding that exploits inter-frame correlation to achieve higher coding efficiency in coding color frame sequences and maintains the beneficial features of all-intra-coding such as computational simplicity, parallel processing, no error-propagation between frames, and random frame access.

Shortcomings of the prior art are also overcome and additional advantages are provided through the provision of a method encoding a sequence of color frames, the method includes: obtaining, by a processor, a sequence of color frames; optionally creating a color transform for a first frame of the sequence of color frames; rendering, by a processor, in at least three components, a first frame of the sequence of color frames, wherein each component represents a different color value; for each of the at least three components, performing a wavelet transform on the first frame; for each of the at least three components, constructing a significant points list and a list of insignificant sets and creating an individual spatial tree of the list of insignificant sets for each component of the at least three components for the first frame; for each of the at least three components, initializing the significant points list and the list of insignificant sets; searching, by the processor, all of the at least three components to identify a most significant bit in the first frame; creating, by the processor, a significance map for the first frame by searching the individual spatial trees for each component of the at least three components, wherein the significance map represents all of the at least three color components; retaining, in a memory, the significance map as a key frame significance map, wherein the key frame significance map is utilized by the processor to encode a frame subsequent to the first frame in the sequence of color frames if the frame is within a given tolerance; and retaining, in the memory, one of: the first frame, or the color transform of the first frame, as a key frame.

Computer systems, computer program products, and methods relating to one or more aspects of the technique are also described and may be claimed herein. Further, services relating to one or more aspects of the technique are also described and may be claimed herein.

Additional features are realized through the techniques of the present invention, including but not limited to additionally: obtaining, by the processor, a second frame of the sequence of color frames; determining, by the processor, if the second frame is within the given tolerance of the key frame; based on determining that the second frame is within the given tolerance, encoding, by the processor, the second frame utilizing the key frame significance map; and based on determining that the second frame is not within the given tolerance, creating, by the processor, a significance map for the second, wherein creating the significance map for the second frame comprises: optionally creating a color transform for a second frame of the sequence of color frames; rendering, by a processor, in at least three components, a second frame of the sequence of color frames, wherein each component represents a different color value; for each of the at least three components, performing a wavelet transform on the second frame; for each of the at least three components, constructing a significant points list and a list of insignificant sets and creating an individual spatial tree of the list of insignificant sets for each component of the at least three components for the second frame; for each of the at least three components, initializing the significant points list and the list of insignificant sets; searching, by the processor, all of the at least three components to identify a most significant bit in the second frame; creating, by the processor, the significance map for the second frame by searching the individual spatial trees for each component of the at least three components, wherein the significance map represents all of the at least three color components; and retaining, in the memory, the significance map for the second frame as the key frame significance map, wherein the key frame significance map is utilized by the processor to encode a frame subsequent to the second frame in the sequence of color frames if the frame is within a given tolerance; and retaining, in the memory, one of: the second frame, or the color transform of the second frame, as the key frame.

BRIEF DESCRIPTION OF DRAWINGS

One or more aspects of the present invention are particularly pointed out and distinctly claimed as examples in the claims at the conclusion of the specification. The foregoing and objects, features, and advantages of one or more aspects of the invention are apparent from the following detailed description taken in conjunction with the accompanying drawings.

FIG. 5 depicts a workflow of an aspect of an embodiment of the present invention.

DETAILED DESCRIPTION OF THE INVENTION

Figure 1:
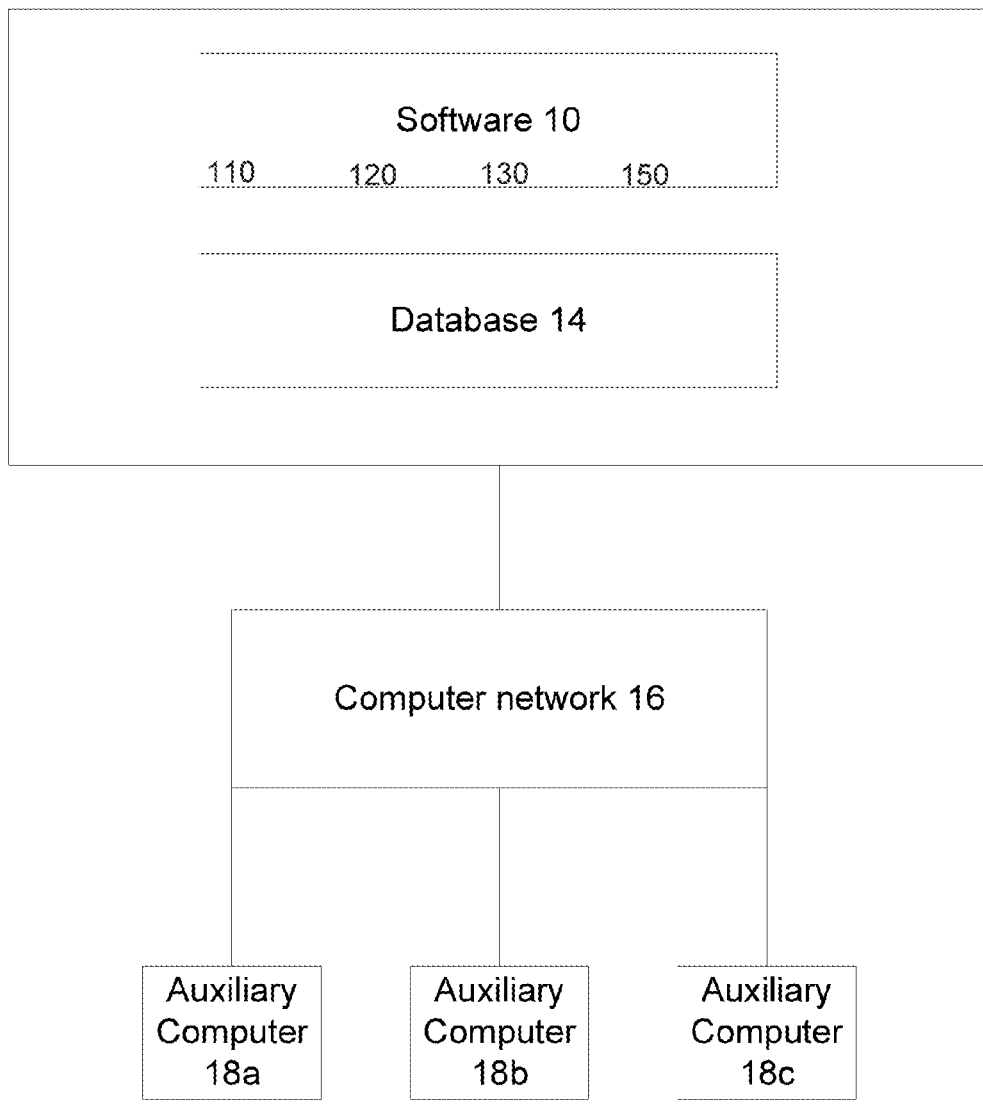
FIG. 1 depicts a computer system configured to perform an aspect of an embodiment of the present invention.

Aspects of the present invention and certain features, advantages, and details thereof, are explained more fully below with reference to the non-limiting examples illustrated in the accompanying drawings. Descriptions of well-known materials, fabrication tools, processing techniques, etc., are omitted so as not to unnecessarily obscure the invention in detail. It should be understood, however, that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure.

The computer system, method, and computer program product described herein address the problem of efficient image sequence coding that exploits inter-frame correlation to achieve higher coding efficiency in coding sequences of color frames, including but not limited to, color digital video, and maintains the beneficial features of all-intra-coding, such as computational simplicity, parallel processing, no error-propagation between frames, and random frame access. Advantages of embodiments of the present invention include: 1) no special quantization or bit allocation is needed for different color (transform) components; 2) rate allocation and quantization is achieved naturally among and within components; 3) compared to other known methods, embodiments of the present invention are both fast and more efficient; and 4) full embedding in embodiments of the present invention utilizes only an order of a minimum of three (3) components of memory.

A notable advantage of the technique is the production of a single significance map for a given frame of a color image sequence that represents all color components comprising the frame simultaneously. In existing methods, a separate significance map is produced for each of at least three (3) color components, which would be a very complicated and inefficient procedure in the present invention that re-uses a key frame to encode subsequent frames. By producing a single significance map that intermingles the color components of the frame into this map by decreasing order of most significant bit, the present technique provides a greatly simplified and, therefore, more efficient coding color image sequences, including but not limited to, color video files.

Utilizing a method with the above-described benefits to code non-color video was disclosed in "Motion differential set partition coding for image sequence and video compression," J. Vis. Common Image R., 2012, by Yang Hu and William A Pearlman, which is incorporated herein in its entirety. However, the embodiments of the present invention enable the coding of color frame sequences, including but not limited to, color digital video with these advantages.

Embodiments of the present method also benefit from the set partitioning in hierarchical trees method, described in U.S. Pat. No. 5,764,807, entitled "Data Compression Using Set Partitioning in Hierarchical Trees," and U.S. Pat. No. 6,674,911 entitled "N-dimensional Data Compression Using Set Partitioning in Hierarchical Trees," which are incorporated herein by reference in their entirety.

As explained in greater detail below, embodiments of the present invention perform a method that includes: 1) performing a color transform; 2) performing a wavelet transform on each of the aforementioned at least three components separately; 3) initializing List of Significant Points (LIP) and List of Insignificant Sets (LIS) lists by concatenating the low horizontal, low vertical (LL) subbands of each component; 4) searching within individually within the various color components of the LIS members searched (as performed in SPIHT); and 5) creating a significance map from each frame; and 5) evaluating whether a subsequent frame meets a predefined threshold of similarity; and 6) reusing the significance map when frames meet a predefined threshold of similarity.

In certain embodiments of the present invention, the color transform step is omitted. For example, for color video, the camera output may be delivered in YUV color format, so no color transform is performed.

In embodiments of the present invention, the resultant significance map is utilized for all colors, for example, the Y, U, and V values are mixed in the same map, rather than utilizing a different map for each color.

In embodiments of the present invention, each frame can be encoded and decoded separately from other frames. In embodiments of the present invention, there is no reconstruction of encoded frames in the encoder, as it is done with interframe prediction methods. To achieve greater efficiency in the encoding of images, embodiments of the present technique spilt color image sequences into key-frames and correlated-frames, which are discussed in greater detail in reference to aspects of the present technique. In various embodiments, to exploit inter-frame correlation, the encoding of a correlated-frame refers to the significance map of its previous coded key-frame. In embodiments of the technique, the decoding of any frame, whether a key-frame or a correlated-frame, involves only the common data, i.e., the significance map and sign information, and the self data of the specific frame, and is separate from the decoding of other frames.

Embodiments of the present technique utilize a similar framework as other so-called motion-coding methods, such as the motion JPEG and motion JPEG2000, in that random access to any frame at the decoder is assured. But in embodiments of the present technique, the frames of an image sequence are compressed either as key-frames or as correlated-frames. The former are coded conventionally. The latter are coded utilizing the significance map and the sign data of a previously coded key-frame to predict the locations and signs of the significant coefficients of the current frame. Embodiments of the present technique can re-use the significance map of one frame when coding another frame because the similarity of the frames is within a given predefined configurable tolerance or threshold.

FIG. 1 is a computer system 100 configured to perform at least one aspect of an embodiment of the present invention. In the embodiment of FIG. 1, software 10 is executed by at least one processor on a computer, termed a base computer 12 in FIG. 1 for clarity. The terms software, program code, computer program code, code, computer program product, and executable instructions, are used interchangeably throughout this application.

The software comprises code that is accessible to the processor and executable by at least one processor of the computer 12. The software can be stored on a memory on the physical computer 12, and/or in a memory and/or on removable media accessible to the computer 12 via a network connection, including but not limited to, a wireless and/or wireless network, utilizing a protocol known to one of skill in the art. The computer may also be configured to act as a web server, which may be capable of running the software and hosting and/or interacting with the database 14.

The base computer 12, as well as any other computer described in the present specification can includes personal computers, servers, smart phones, mobile devices, laptops, desktops, and/or any means of personal or corporate computing device capable of executing the software 10 or portions of the software 10, or communicating with a computer executing the software 10 over a wireless or hard wired network.

In one aspect, the embodiment of FIG. 1 utilizes different modules within the software 10 to perform different functionality. This separation of functionality into modules is offered for ease of understanding as a non-limiting example of a possible organization of the software 10. Some modules in an embodiment of the present invention include a color transform module 110, a wavelet transform module 120, and initialization module 130, and a search module 150.

In the embodiment of FIG. 1, the base computer is connected to a computer network 16, including but not limited to private and publicly accessible wired and wireless networks, and the Internet. In this embodiment, one or more computers, termed auxiliary computers 18a-18c are communicatively connected to the computer 12 via a computer network 16, including but not limited to, the Internet. The auxiliary computer 18a-18c receive data from the computer 12, via, for example, the web server on the computer 12 and the auxiliary computers 18a-18c can be used to upload a sequence of color frames, including but not limited to, color digital video, for encoding and compression by the base computer 12, and the base computer can obtain data from the auxiliary computers 18a-18c, including but not limited to, the color digital videos.

The base computer 12 in the embodiment of FIG. 1 includes a database 14, which is utilized in some embodiment of the present invention. Additional embodiments of the present invention utilize databases and other memory devices in different physical locations that are remotely accessible to the base computer 12 executing the software 10. In the embodiment of FIG. 1, the database 14 stores the sequence of frames to be compressed as well as the encoded frames, post-compression.

Figure 2:
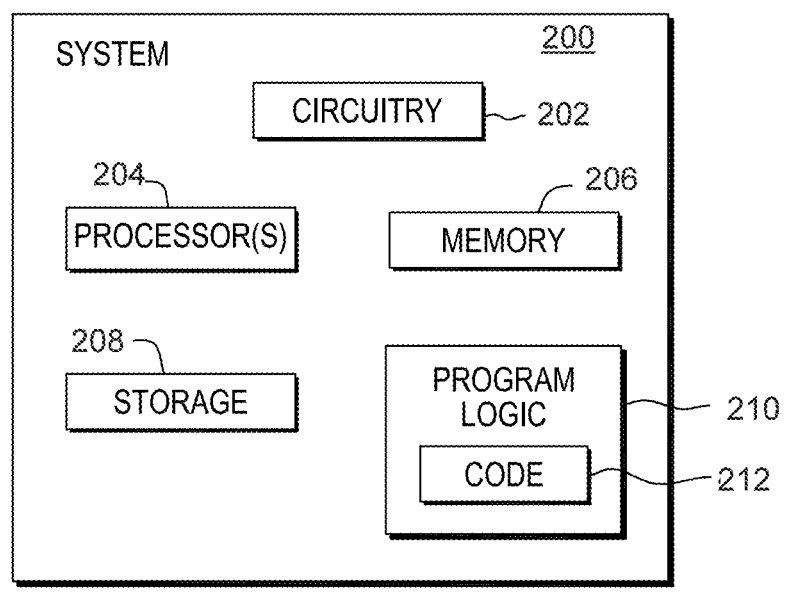
FIG. 2 depicts one embodiment of a single processor computing environment to incorporate and use one or more aspects of the present invention.

FIG. 2 illustrates a block diagram of a resource 200 in computer system 100, such as base computer 12 and auxiliary computers 18a-18c, which is part of the technical architecture of certain embodiments of the technique. Returning to FIG. 2, the resource 200 may include a circuitry 202 that may in certain embodiments include a microprocessor 204. The computer system 200 may also include a memory 206 (e.g., a volatile memory device), and storage 208. The storage 208 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 208 may comprise an internal storage device, an attached storage device and/or a network accessible storage device. The system 200 may include a program logic 210 including code 212 that may be loaded into the memory 206 and executed by the microprocessor 204 or circuitry 202.

In certain embodiments, the program logic 210 including code 212 may be stored in the storage 208, or memory 206. In certain other embodiments, the program logic 210 may be implemented in the circuitry 202. Therefore, while FIG. 2 shows the program logic 210 separately from the other elements, the program logic 210 may be implemented in the memory 206 and/or the circuitry 202.

Figure 3:
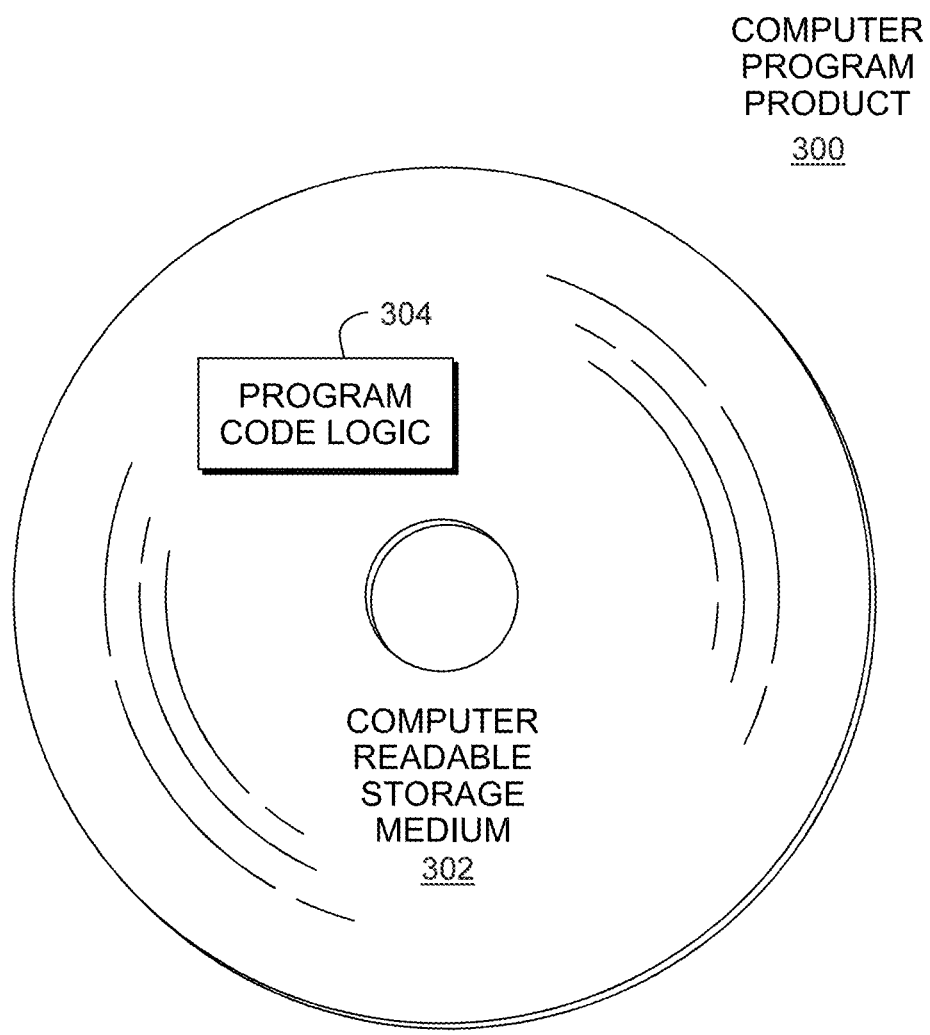
FIG. 3 depicts one embodiment of a computer program product incorporating one or more aspects of the present invention.

Using the processing resources of a resource 200 to execute software, computer-readable code or instructions, does not limit where this code can be stored. Referring to FIG. 3, in one example, a computer program product 300 includes, for instance, one or more non-transitory computer readable storage media 302 to store computer readable program code means or logic 304 thereon to provide and facilitate one or more aspects of the technique.

As will be appreciated by one skilled in the art, aspects of the technique may be embodied as a system, method or computer program product. Accordingly, aspects of the technique may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the technique may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electromagnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electromagnetic, optical or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the technique may be written in any combination of one or more programming languages, including an object oriented programming language, such as Java, Smalltalk, C++ or the like, and conventional procedural programming languages, such as the "C" programming language, PHP, ASP, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the technique are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions, also referred to as software, such as the software 10 in FIG. 1, may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the technique. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the technique may be provided, offered, deployed, managed, serviced, etc. by a service provider who offers management of customer environments. For instance, the service provider can create, maintain, support, etc. computer code and/or a computer infrastructure that performs one or more aspects of the technique for one or more customers. In return, the service provider may receive payment from the customer under a subscription and/or fee agreement, as examples. Additionally or alternatively, the service provider may receive payment from the sale of advertising content to one or more third parties.

In one aspect of the technique, an application may be deployed for performing one or more aspects of the technique. As one example, the deploying of an application comprises providing computer infrastructure operable to perform one or more aspects of the technique.

As a further aspect of the technique, a computing infrastructure may be deployed comprising integrating computer readable code into a computing system, in which the code in combination with the computing system is capable of performing one or more aspects of the technique.

As yet a further aspect of the technique, a process for integrating computing infrastructure comprising integrating computer readable code into a computer system may be provided. The computer system comprises a computer readable medium, in which the computer medium comprises one or more aspects of the technique. The code in combination with the computer system is capable of performing one or more aspects of the technique.

Further, other types of computing environments can benefit from one or more aspects of the technique. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the technique, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

Figure 4A:
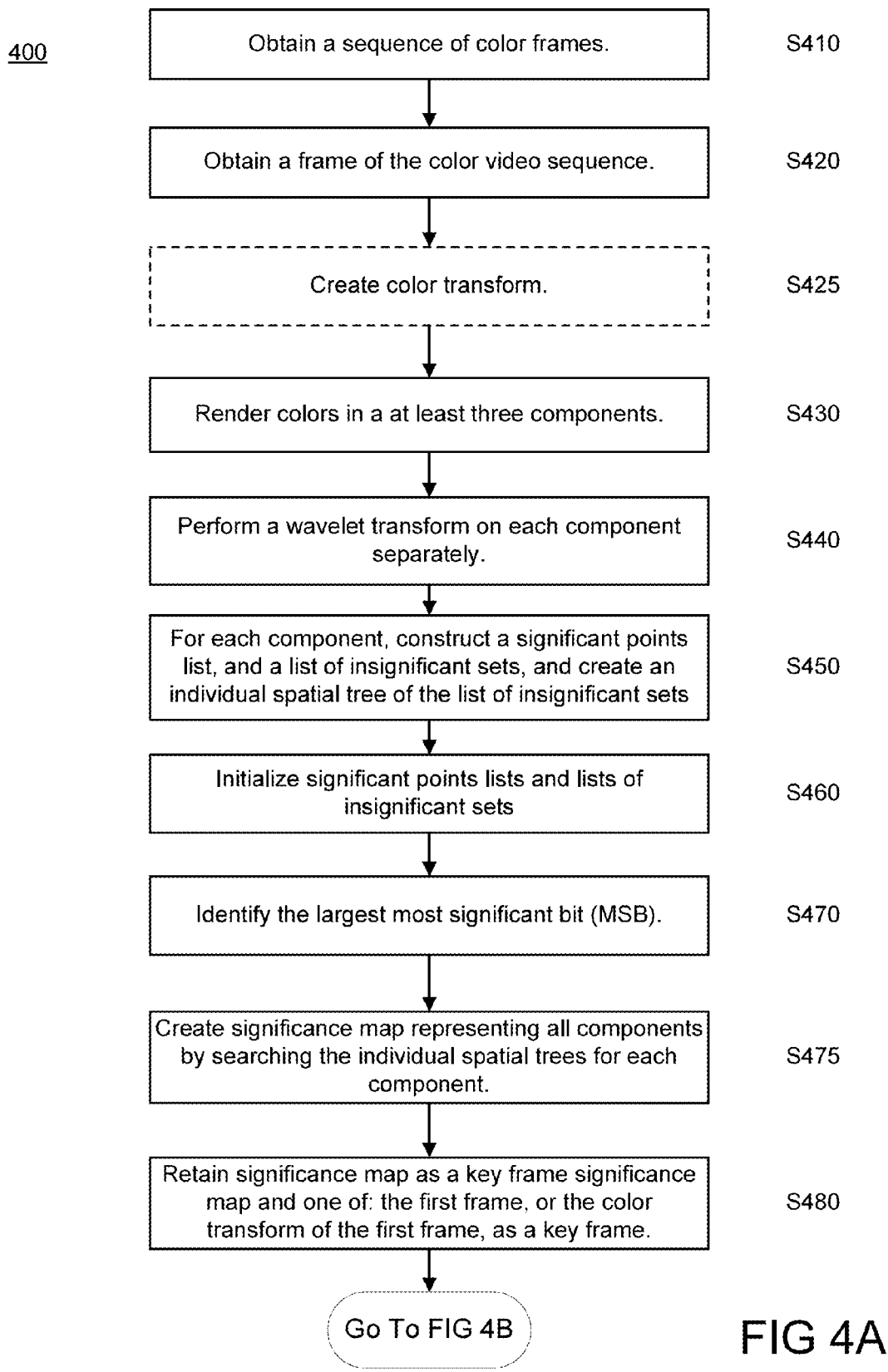
FIGS. 4A and 4B depict workflows of aspects of an embodiment of the present invention.

FIG. 4A is a workflow of at least one aspect of an embodiment of the present invention. As seen in this workflow, embodiments of the present technique the software 10 generates significance maps for frames in the sequence of color frames in order to encode those frames. However, when the software 10 determines that a frame is similar enough to a frame for which the significance map is known, the software can encode the second frame with the significance map of the first frame and, if desired in the embodiment, the software 10 can predict the locations and signs of the significant coefficients of the second frame. Thus, the frames of the sequence are either considered key-frames (frames with individual significance maps) or correlated frames (frames that utilize a significance map of a key frame).

In FIG. 4A, the processor on the base computer 12 obtains a sequence of color frames, including but not limited to, color digital video, either from a memory device, including removable memory, accessible to the base computer, and/or from an auxiliary computer 18a-18c (S410). From the color frame sequence, the software 10 obtains a frame, because the frames are obtained sequentially, the first frame obtained would be the first frame of the sequence (S420). One or more processors on the base computer 12 access the sequence of color frames and execute software 10 to create a color transform (S425). The color transform is performed for each frame of the sequence of color frames.

As explained earlier, the color transform is optional in certain embodiments of the present invention. For example, in certain embodiments, when the sequence of color frames is color video, the camera output is commonly delivered in YUV color format, so the present technique does not include performing a color transform. In further embodiments of the present invention, it may be advantageous to reduce color correlation among the at least three components. Reducing the correlation between the color components can be accomplished by utilized a correlating transform, including but not limited to YUV or YCbCr.

Equation 1 below is one example of a non-standardized transform for colors in a digital color video in embodiments of the present invention. This non-standardized transform was selected as an example because it possesses certain properties, including but not limited to, it is compatible with both RGB and BGR component ordering and unitary. One of skill in the art will recognize that any standard or non-standard color transform that is a color correlating transform can be used in place of the example below.

$$T = a/2 \begin{pmatrix} 2 & 2 & 2 \\ 1 & -1 & 1 \\ 1 & -1 & 1 \end{pmatrix} + 1/2 \begin{pmatrix} 0 & 0 & 0 \\ 1 & 0 & -1 \\ -1 & 0 & 1 \end{pmatrix} \qquad \text{Equation 1}$$

$$a = 1/\sqrt{3}$$

Returning to FIG. 4A, once the color transform is complete for the frame, the colors are rendered in at least three components (S430), for example, Y, U, and V. The software 10 executed by the processor then performs a wavelet transform on each component separately (S440) for the given frame. The nature of the wavelet transform is discussed in more detail in later examples. However, one of skill in the art will be familiar with wavelet transforms related to SPIHT and motion differential SPIHT (MD-SPIHT).

In an embodiment of the present invention, the wavelet transform comprises decomposition.

In an embodiment of the present invention, the wavelet transform utilized one of a variety of filters known to one of skill in the art.

In an embodiment of the present invention, the color transform comprises subsampled chrominance.

Returning to FIG. 4A, for each component, the software 10 constructs a significant points list, and a list of insignificant sets, and creates an individual spatial tree of the list of insignificant sets (S450). The software then initializes the significant points lists and the lists of insignificant sets (S460). Related to this process, the software 10 identifies the largest most significant bit (MSB) in the frame, i.e., $n_{max}$, (S470) and, as will be discussed in more detail later, the software 10 creates a single significance map representing all components by searching the individual spatial trees of each component (S475).

FIG. 5 demonstrates the wavelet transform process in an embodiment of the present invention. The described method for set partition coding for image sequence and color frame sequence compression utilizes a significance map. SPIHT, which is referenced here, is not the only image compression algorithm that utilizes a significance map. Thus, aspects of the described method can be utilized with SPIHT, set partitioning embedded block (SPECK) and/or any set partitioning coder (SPC).

In FIG. 5, the software 10 has separated the colors in the frame into three components by performing the aforementioned color transform and/or received a YUV output from a color video source. As understood by one of skill in the art, and seen in FIG. 5, a wavelet transform is performed for each color component in a frame, whereby the software 10 produces zones of similar spatial frequency content called subbands in each color component.

Figure 6:
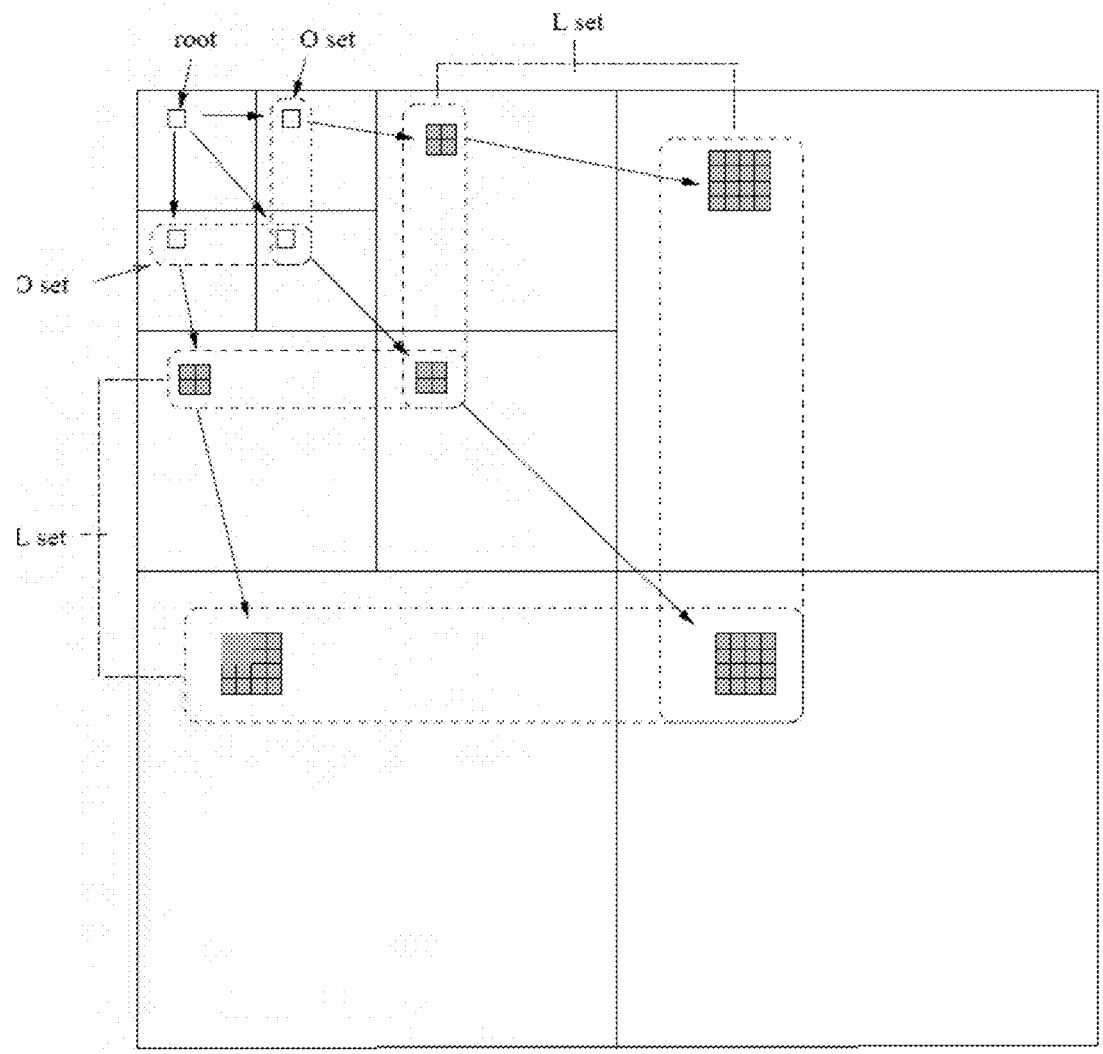
FIG. 6 depicts aspects of how a spatial orientation tree is defined in a pyramid.

For example, in an embodiment of the present invention, the software 10 utilizes aspects of the SPIHT by creating a spatial orientation tree that defines the spatial relationship within the hierarchical subband pyramid. FIG. 6 shows how a spatial orientation tree is defined in a pyramid that is constructed with recursive branching to four offspring nodes when passing a significance test. Each node of the tree corresponds to a pixel, and is identified by the pixel coordinate. Its direct descendants (offspring) correspond to the pixels of the same spatial orientation in the next finer level of the pyramid. The tree is defined such that each node has either no offspring, i.e., leaves, or four offspring, which always form a group of 2×2 adjacent pixels. In FIG. 6, the arrows are oriented from each parent node to its four offspring. The pixels in the highest level of the pyramid are the tree roots and are also grouped in 2×2 adjacent pixels. However, their offspring branching rule is different, and one of them (indicated by the start—the upper left corner point in each group) has no descendants. Each of the other three in the group has a branching to a group of four in a subband of the same orientation in the same level.

Figure 7:
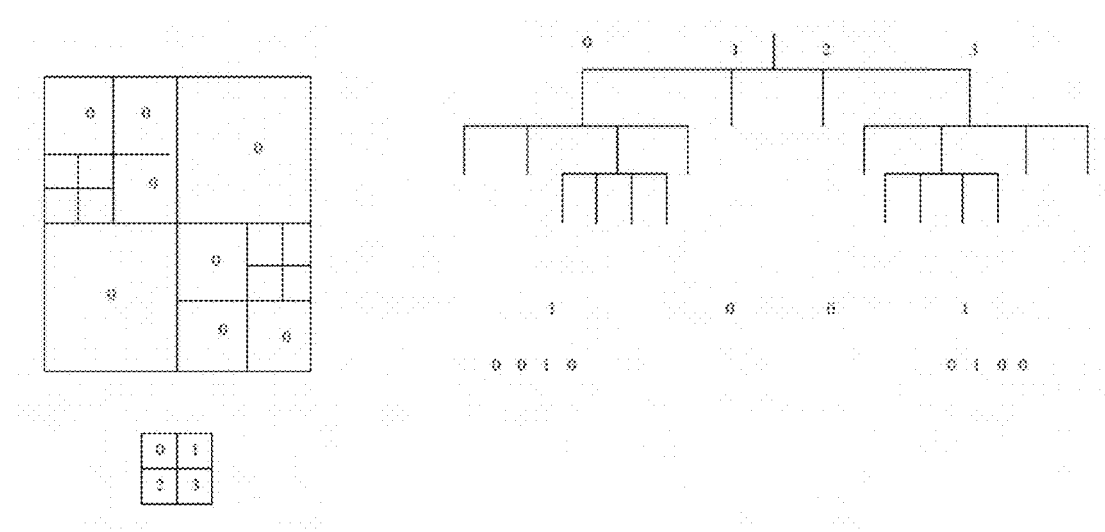
FIG. 7 depicts recursive quadrisection is an aspect of the present invention.

Referring now to FIG. 7, for example, in the SPECK embodiment of a set partitioning coder (SPC), software 11 splits the full size set into four quadrants. In each quadrant, at least one of the quadrants contains a significant pixel, i.e., $n_{max}$, so is significant. Now turning to FIG. 7, the quadrants are identified by the software 10 as either significant or insignificant quadrants. For ease of understanding this process, in FIG. 7, the significant quadrants are labeled with '1' and the insignificant quadrants with '0.' Then, the 1-labelled quadrants are split again into four quarter-size sets, which are then labeled as '1' if significant and '0' if insignificant. All 0-labelled (insignificant) sets are left alone and their top left coordinates put on a list called the LIS (List of Insignificant Sets). Significant (1-labelled) sets continue to be quadrisected (quad-split) until significant pixels are isolated. This recursive quadrisection in embodiments of the present invention is demonstrated in FIG. 7.

Returning to FIG. 5, the software 10 has completed the recursive quadrisection in each color component. The LIS and LIP lists are created for each component and therefore, the significance map for the color frame is known. Thus, a significance map for the overall frame has been created by the software 10

Returning to FIG. 4A, in this embodiment of the present invention, the software 10 searches the individual spatial orientation trees or quadtrees formed by quadrisection (which are based on the identified significant portions) within the three components of the LIS members (S475). The resultant significance map from the searches performed on the trees is both color-embedded and rate embedded as the software 10 mixes significance maps of different color components and higher bit planes precede those of lower bit planes. Embodiments of the present invention vary from prior methods in part because the significance map is a blended significance map; prior methods utilize multiple significance maps, one map to each color component. The significance map of a first frame is retained, as is either the first frame or its color transform (S480). This first frame (or the color transform thereof) and significance map are referred to as the key frame and the significance map of the key frame and can be utilized to encode subsequent frames within the sequence that are within a given tolerance threshold.

In a further embodiment of the present invention, for every frame, the encoder output, part of which is the significance map, is transmitted in the output code stream, along with an indicator bit to signify whether the frame is a key frame or a correlated frame.

Once a significance map is known for a given frame, the software can apply this significance map to later frames within a certain tolerance. A workflow of an embodiment of the present invention that codes subsequent frames is depicted in FIG. 4B.

Figure 4B:
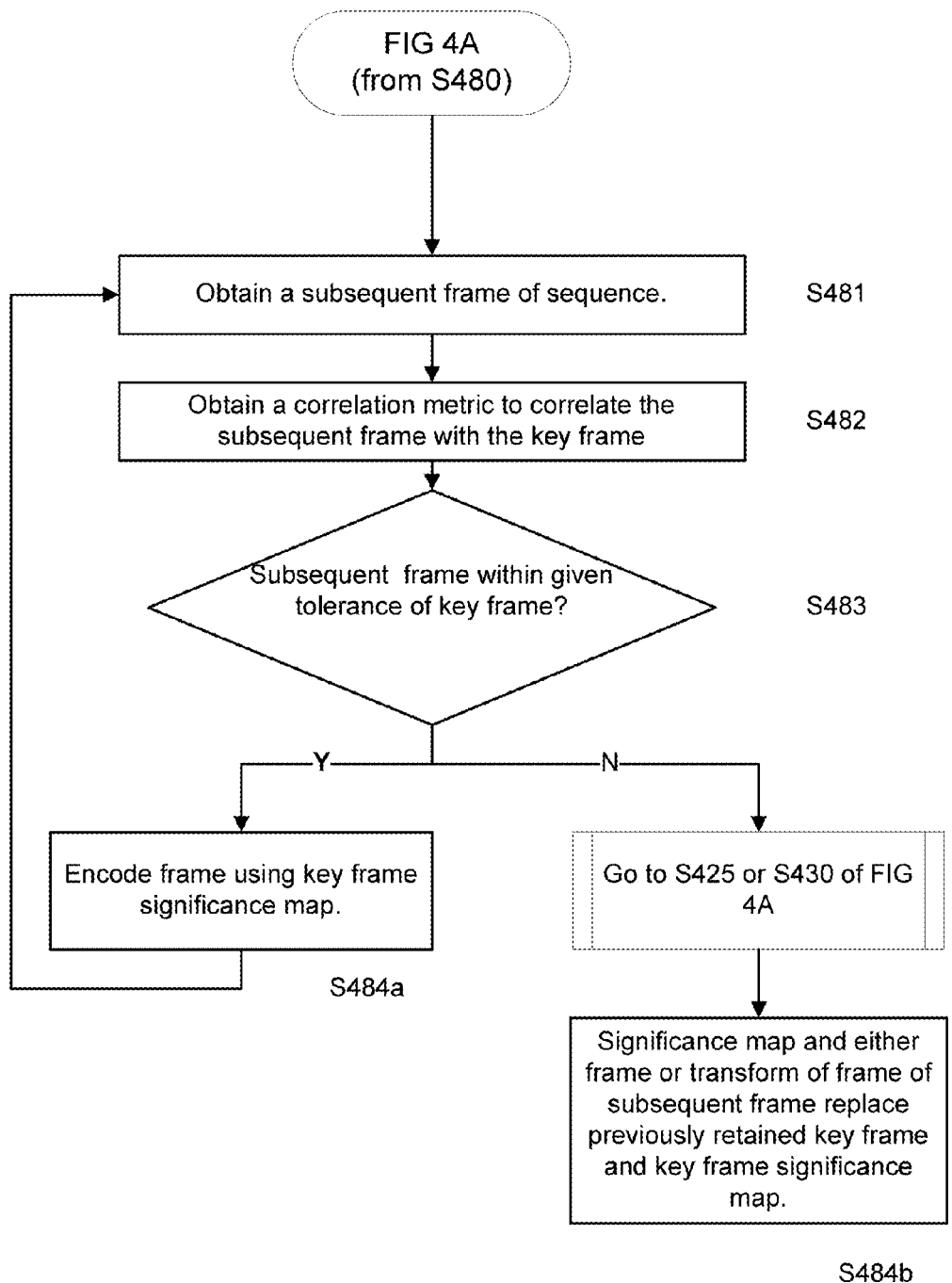

In FIG. 4B, the software 10 obtains a subsequent frame, for example, a second frame of the color frame sequence (S481). The software 10 determines a correlation metric in order to correlate the subsequent frame with the retained, key frame (S482). In an embodiment of the present invention, the correlation metric is the mean squared difference (MSD). The software 10 then determines whether the subsequent frame is within a given tolerance (i.e., whether the subsequent from is a correlated frame) (S483). When the software determines that the subsequent frame is a correlated frame, the software 10 utilizes the significance map and the sign data of the previously coded frame (key frame) to encode subsequent frame (S484a). The software 10 can predict the signs and locations of the significant coefficients of this correlated frame. When the software 10 determines that this new frame is not within a given tolerance, it cannot be encoded utilizing key frame significance map, thus, the software 10 executes the workflow in FIG. 4A, starting, with rendering the color in at least three components (S430), or, optionally, creating a color transform (S425). The software continues this processing until it creates a new significance map for this subsequent frame (S470). As seen in FIG. 4A, the software 10 retains the significance map of this subsequent frame in memory as a key frame (S480), replacing the formerly retained key frame and significance map of the key frame with this new key frame, and the significance map of this new key frame (S484b).

In embodiments of the present invention, the software 10 can utilize a variety approaches to designate the key frame and/or the key frame significance map. In an embodiment of the present invention, the software 10 can retain the key frame significance map and/or the key frame in a memory. In a further embodiment of the present invention, the processor can designate the frame as the key frame.

In an embodiment of the present invention, the processor transmits the significance map portion of a frame's code, when it is encountered in the frame sequence. In an embodiment of the present invention, the key frame and its significant map are held in memory and are neither transmitted nor written to the output. In this embodiment, an indicator, e.g., an indicator bit, is sent to tell the decoder whether a frame is a key frame or a correlated frame (a frame within a given tolerance of the key frame). Since the decoder has already seen and decoded the key frame as identified by the indicator, it can use it for the reference for decoding a following correlated frame. Thus, in this embodiment, for every frame, the encoder output, which includes the significance map, is transmitted in the output code stream, along with an indicator bit to signify whether the frame is a key frame or a correlated frame.

For each frame of the color frame sequence, the software 10 identifies each frame as a correlated frame. If the software 10 determines that the frame is a correlated frame, in accordance with FIG. 4B, the software 10 utilizes the significance map and the sign data of the previously coded frame (key frame) retained in a memory accessible to the software 10, and predicts the locations of the signs of the significant coefficients of this now correlated frame (S484a). If the subsequent frame exceeds the threshold, the new frame is processed in accordance with FIG. 4A, and eventually, The software 10 retains the significance map of this subsequent frame in memory as a key frame (S480), and, in accordance with FIG. 4B, replaces the previously retained key frame, and associated significance map, with this new key frame and associated significance map (S484b).

In embodiments of the present invention, correlated frames can be encoded in parallel. In an embodiment of the present invention, the correlation metric utilized by the software can include, but is not limited to the mean squared difference (MSD), which is sometimes also referred to as the mean squared error. For example, the software can calculate the MSD between successive frames, which includes the pixels of all color components. In one non-limiting example, the color components may be Y, U, and V. Then MSD is converted to PSNR by PSNR=10*log 10 (255^2/MSD). In an aspect of the present invention, the PSNR is obtained by the software 10 and utilized to identify reference (key) frames and correlated frames.

The use of correlated frames in embodiments of the present invention aids in the efficiency of encoding color frame sequences, including but not limited to, color video, because the same significance map and sign data can be used on an identified range of frames without performing a significance test to generate a new significance map. Instead, embodiments of the present technique read the significance map of a key frame in order to locate initially significant positions in the correlated frames.

In an embodiment of the present invention, the $X_i$ coefficients in significant positions are significant with a high probability, because key and correlated frames can be highly correlated. Thus, indicators can be utilized by the software 10 to better appreciate the compatibility of the frames. In the example below $X_i$ is the possible correlated frame and $X_0$ is the key frame. Provided that $X_i$ is within a given threshold of tolerance of $X_0$, map($X_0$), the significance map for color frame $X_0$, will be utilized to encode frame $X_i$, thus making $X_i$ a correlated frame.

As seen in FIG. 4B, the software 10 performs a correlation analysis between frames as part of determining whether a later frame is within a given tolerance. For most image sequences, the neighboring frames are correlated, i.e., the significance map of the identified key-frame can be utilized. For example, the wavelet coefficients at the same position, (i,j), in adjacent frames, X and Y, maintains the correlation. Given some threshold T=2" (bit plane n), four relationships between the wavelet coefficients CX(i,j) and CY (i,j) contribute to the software determining whether it can apply the significance map of frame X to frame Y. These circumstances are as follows: 1) both CX(i,j) and CY (i,j) are significant; both CX(i,j) and CY (i,j) are insignificant; 3) CX(i,j) is significant and CY (i,j) is insignificant; or 4) CX(i,j) is insignificant and CY (i,j) is significant.

Differential-SPIHT can be understood as is the coding scheme applied to the differential-frames, denoted as the Y frames in the explanations that follow. In an embodiment of the present invention, the threshold utilized by the software is represented by $T_{last}$. The significance map of frame X, map (X), conveys the information that identifies the positions of the significant coefficients at each iteration for frame X, and such positions are called significant locations. The remaining locations with insignificant coefficients with respect to $T_{last}$ are called insignificant locations. Therefore, the significance map distinguishes the significant and insignificant locations with respect to $T_{last}$. For frame X, all the coefficients on the significant locations are significant, and on the insignificant locations are insignificant. However, applying map(X) to frame Y, there are four possible cases, which are the alternative expressions of the four relationships that represent the correlation of adjacent frames X and Y: 1) Significant location with significant coefficient; 2) Insignificant location with insignificant coefficient; 3) Significant location with insignificant coefficient; and 4) Insignificant location with significant coefficient.

In an embodiment of the present invention, significant locations with significant coefficients and insignificant locations with significant coefficients (with respect to $T_{last}$) may be coded by utilizing the significance maps of a previously coded frames.

In the case where the software determines significant locations with significant coefficients, the software re-uses the significance map of a previously coded map-frame to exploit the inter-frame correlation and codes the significant coefficients at those locations which are indicated by the significance map. The described process is generally called SPC* and is called SPIHT* in the described embodiment.

In an embodiment of the present invention, the software reads the significance map of X, map(X), to iteratively identify the possibly significant positions for Y. At each iteration of this identification process, the selected significant positions of Y are exactly the same as those of X. The Y coefficients in these significant positions may be significant due to the correlation between X and Y. The paragraphs that follow illustrate one example of a process that can be executed by the software to re-use the significance map of a previously coded map-frame to exploit the inter-frame correlation between that frame and at least one subsequent frame of the sequence of color frames being coded.

In the following example, (i,j) represents the significant location at the iteration with threshold T. The coefficient $C_Y$ (i,j) involves the sign and the magnitude. For the sign of $C_Y$ (i,j), it may be the same as the sign of $C_X$(i,j) or it may be different from the sign of $C_X$ (i,j). The sign of $C_X$ (i,j) is available to the software from the read-in sign(X). For the magnitude of CY (i,j), it may be insignificant ($|C_Y(i,j)|<T$); it may be just significant ($T \leq |C_Y (i,j)| < 2T$); it may be super significant ($|C_Y(i,j)| > 2T$).

The software sends a marker symbol to indicate the specific case to which $C_Y$ (i,j) belongs. In an embodiment of the present technique, the marker symbols may be entropy coded by the software with Huffman codes based on the statistics gathered from simulations, or with adaptive arithmetic coding. The software then updates the coefficient to be $|C_Y(i,j)|$ for the insignificant case or ($|C_Y(i,j)| - T \times m$) for the just significant and super significant cases, where m=floor($|C_Y(i,j)|$/T). In this example, small m's can be represented by the marker symbols, while large m's can be coded with Exponential-Golomb code of order-0 (EG-0 code), which is a prefix-free code used in H.264 texture coding for the large coefficient values.

The software then makes a refinement pass. During this pass, the software outputs the bits in bit-plane n of the coefficients that are previously found significant as ref (Y). After this refinement pass, the software has coded the significant coefficients in the significant locations.

In the case where the software determines the significant coefficients in the insignificant locations, in an embodiment of the present invention, the software utilizes differential sorting in order to code the sequence of color frames. In Differential-sorting, the threshold is set to be $T_{last}$, and the sorting is enacted on the initial spatial orientation trees. The software performs significance tests, including but not limited to, those performed in conventional SPIHT. The significance map bits convey the positions of significant coefficients of Y* and are denoted by diff map(Y). For each significant coefficient, instead of the sign bit output for conventional SPIHT, the software outputs a marker symbol to indicate the sign and the magnitude. Unlike marker(Y), the process described above when the coefficients and the locations are significant, these markers indicate the signs (+ or −) directly, and there is no such case that the magnitude is insignificant. Similarly, the software can utilize Huffman code to code the markers according to the statistics gathered from simulations, or the software can use adaptive arithmetic coding. In an embodiment of the present invention, the large m's in the super significant case are also EG-0 coded.

In Differential-SPIHT decoding, differential-sorting follows SPIHT* decoding to make sure all the significant coefficients are reconstructed.

Figure 8:
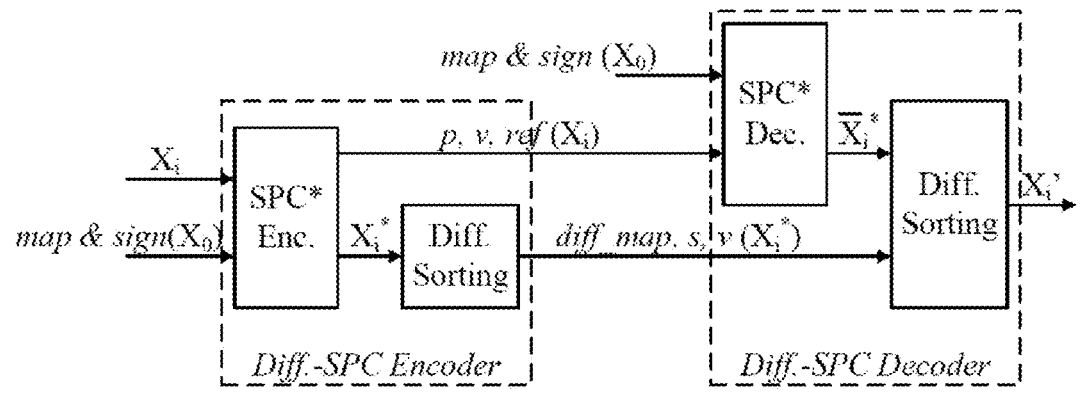
FIG. 8 represents aspects of methods performed by an embodiment of the present invention.
Figure 9:
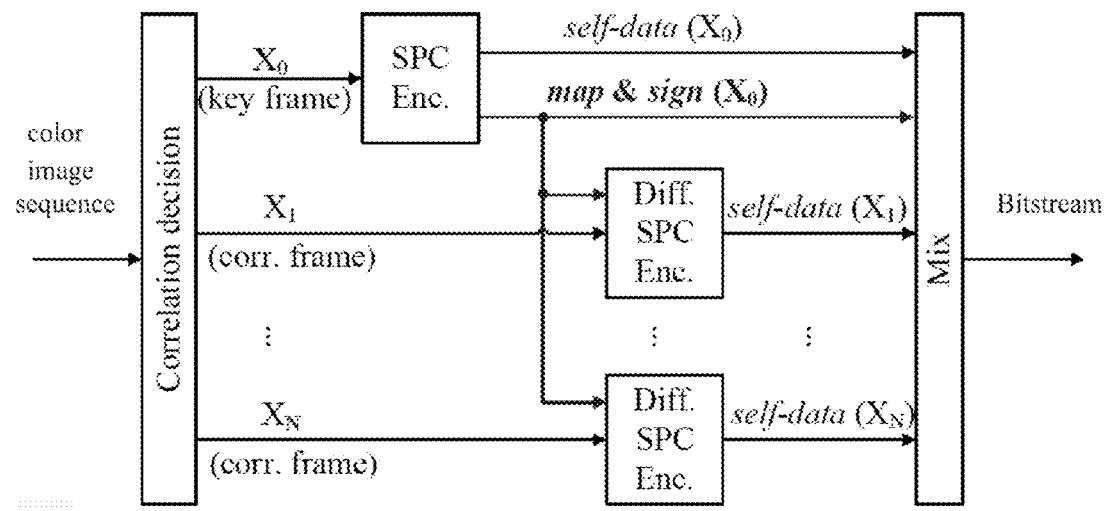
FIG. 9 represents aspects of methods performed by an embodiment of the present invention.

The described processes related to the correlation of the frames are illustrated in more detail in FIGS. 8-9.

When embodiments of the software 10 utilize the present method for encoding a sequence of color frames, including but not limited to color video, the method includes initialization, a sorting pass and a refinement pass. The initialization portion of embodiments of the present technique is described in U.S. Pat. No. 6,674,911 ("N-dimensional Data Compression Using Set Partitioning in Hierarchical Trees", hereinafter the "'911 patent"). However, it includes: 1) creating a list of LSP (least significant points), initially empty, to contain coefficients labeled "1" i.e., significant coefficients; 2) creating a list of insignificant sets (LIS) to contain insignificant coefficients, where the parent or grandparent node of the set is labeled "0"; 3) putting descriptors of the initial sets into the LIS based on the set partitioning method described in the '911 patent; 4) reading the most significant bit of the largest magnitude, $n_{max}$, of key frame $X_0$ from the buffer and setting n equal to $n_{max}$.

To perform the coding of the subband coefficients, three ordered lists, which were discussed earlier, are employed. They are the list of insignificant sets of pixels ("LIS"), the list of insignificant pixels ("LIP"), and the list of significant pixels ("LSP"). In these lists, each entry is identified by a coordinate, which in the LIP and LSP represent individual pixels, and in the LIS represents either a set, which is explained in further detail in the '911 patent.

Figure 10:
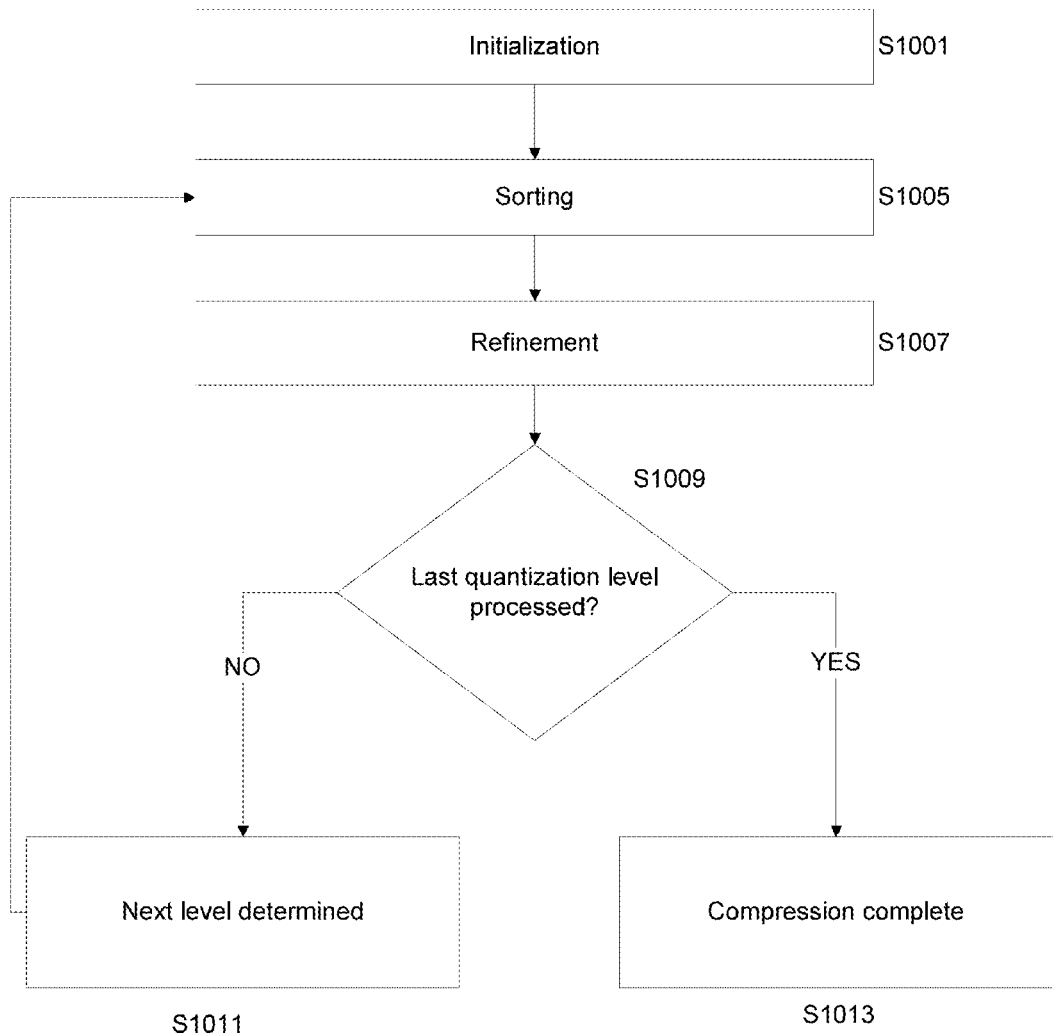
FIG. 10 is a high-level flow diagram of the coding technique of the present invention.

FIG. 10 is a high-level flow diagram of the coding technique of the present invention. As seen in this figure, prior to beginning coding, it is assumed that a subband decomposition of a subject image has already been performed as discussed hereinabove. During initialization (S1001), the lists (LIS, LIP and LSP) used herein are created and the initial quantization level, i.e., bit plane number, is determined. Thereafter, a sorting phase is entered (S1005). Sorting includes the processing of the lists used herein and the outputting of compressed data based upon such processing. A refinement phase (S1007) is entered after sorting, during which data corresponding to pixels determined to be significant during sorting of earlier quantization levels is output. A test is performed to determine if the last quantization level has been processed (S1009) and, if not, the next quantization level is determined (S1011) and the method repeats starting with the sorting phase (S1005). After the last quantization level has been processed, data compression is completed (S1013).

By way of summary, with regard to the sorting phase, the pixels in the LIP are tested, and those that are significant at the current quantization level are moved to the LSP. Similarly, sets are sequentially evaluated following the LIS order, and when a set is found to be significant, it is removed from the LIS and partitioned into new subsets. The new subsets with more than one element are added back to the LIS, while the single-coordinate sets are added to the end of the LIP or to the end of the LSP, depending on whether they are insignificant or significant, respectively.

As discussed above, pixels in the LIP are evaluated prior to the evaluation of sets of pixels in the LIS. This ordering is established because information regarding a pixel is transmitted immediately, thus immediately reducing distortion in the received image. However, information regarding sets is used to generate new tests for sets and pixels which do not have an immediate effect on the received image. Moreover, as discussed in further detail below, if a pixel is moved to a list during set processing, information regarding the moved pixel is immediately transmitted such that distortion in the received image is immediately reduced. Throughout the techniques of the present invention, priority is given to transmitting pixel information as quickly as possible such that the received image may be quickly reconstructed.

Figure 11:
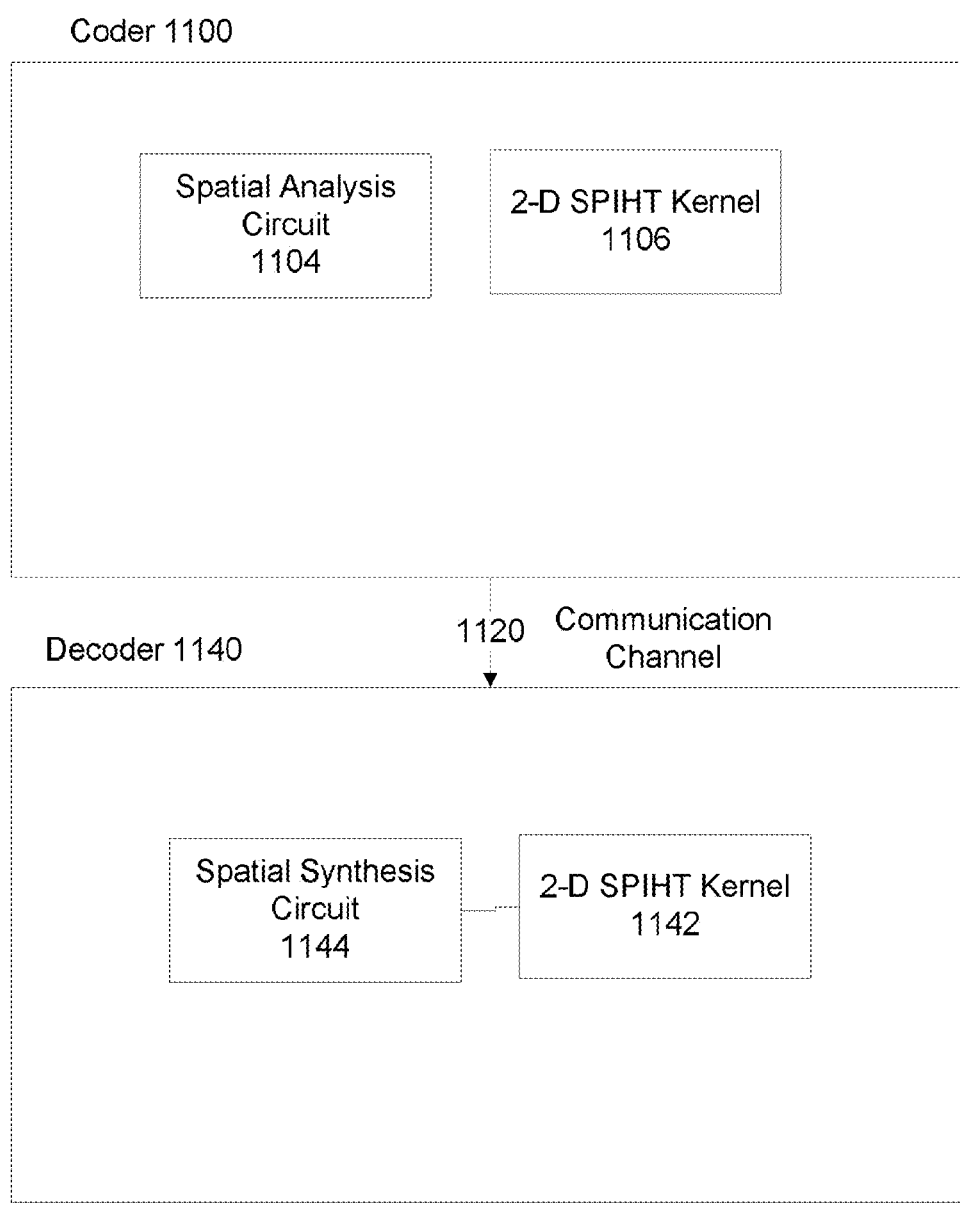
FIG. 11 depicts an embodiment of aspects of the present invention.

In an embodiment of the present invention, an image sequence coding system illustrated in FIG. 11 consists primarily of a 2-D analysis section and a coding section including a 2-D SPIHT kernel. In this embodiment, the decoder has the structure symmetric to that of encoder. More specifically, the coder 1100 includes, but is not limited to, a spatial analysis circuit 1104 and a 2-D SPIHT kernel 1106. In FIG. 11, a communication channel 1120 transfers the output of the coder 1100, i.e., the compressed frame sequence data, to the decoder 1140, which includes a 2-D SPIHT kernel 1142 and a spatial synthesis circuit 1144, communicatively coupled to one another.

In an embodiment of the present invention, each frame will be separately transformed in the spatial domain by spatial analysis circuit. With a 2-D SPIHT kernel, the preset rate is allocated over each frame according to the distribution of actual magnitudes. However, it is possible to introduce a scheme for bit re-alignment by simply scaling one or more color components to emphasize or de-emphasize certain colors, so as to artificially control the visual quality of the frames. For example, when the sequence of color frames includes color video, scaling Y relative to U and V makes Y more accurate as related to UV and gives Y more bits—a viewer's eyes are more sensitive to Y.

Referring to FIG. 4, in an embodiment of the present invention, the program code performs this scaling after performing a color transform (S420) and before coding (S490b). When this type of scaling is performed, to decode, the inverse occurs, i.e., the program code de-scales the color components when reconstructing the original frame.

As explained in the embodiment of FIG. 4A, you search each color separately in order to identify significant sets. Starting in the top corner, the software 10 gathers all sets in a given component to create a threshold test to identify all pixels in a tree above a given threshold. Pixels significant for a given threshold become part of the significance map. When utilizing aspects of the present method with a color frame sequence, the significant pixels are identified individually in each color component. However, the significance map represents a combination of the color components and is utilized for correlated frames.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

What is claimed is:

1. A method for encoding a sequence of color frames, the method comprising:
   obtaining, by a processor, a sequence of color frames;
   optionally creating a color transform for a first frame of the sequence of color frames;
   rendering, by a processor, in at least three components, a first frame of the sequence of color frames, wherein each component represents a different color value;
   for each of the at least three components, performing a wavelet transform on the first frame;
   for each of the at least three components, constructing a significant points list and a list of insignificant sets and creating an individual spatial tree of the list of insignificant sets for each component of the at least three components for the first frame;
   for each of the at least three components, initializing the significant points list and the list of insignificant sets;
   searching, by the processor, all of the at least three components to identify a most significant bit in the first frame;
   creating, by the processor, a significance map for the first frame by searching the individual spatial trees for each component of the at least three components, wherein the significance map represents all of the at least three color components;
   retaining, in a memory, the significance map as a key frame significance map, wherein the key frame significance map is utilized by the processor to encode a frame subsequent to the first frame in the sequence of color frames if the frame is within a given tolerance; and
   retaining, in the memory, one of: the first frame, or the color transform of the first frame, as a key frame.

2. The method of claim 1, further comprising:
   obtaining, by the processor, a second frame of the sequence of color frames;
   determining, by the processor, if the second frame is within the given tolerance of the key frame;
   based on determining that the second frame is within the given tolerance, encoding, by the processor, the second frame utilizing the key frame significance map; and
   based on determining that the second frame is not within the given tolerance, creating, by the processor, a significance map for the second, wherein creating the significance map for the second frame comprises:
   optionally creating a color transform for a second frame of the sequence of color frames;
   rendering, by a processor, in at least three components, a second frame of the sequence of color frames, wherein each component represents a different color value;
   for each of the at least three components, performing a wavelet transform on the second frame;
   for each of the at least three components, constructing a significant points list and a list of insignificant sets and creating an individual spatial tree of the list of insignificant sets for each component of the at least three components for the second frame;
   for each of the at least three components, initializing the significant points list and the list of insignificant sets;
   searching, by the processor, all of the at least three components to identify a most significant bit in the second frame;
   creating, by the processor, the significance map for the second frame by searching the individual spatial trees for each component of the at least three components, wherein the significance map represents all of the at least three color components; and
   retaining, in the memory, the significance map for the second frame as the key frame significance map, wherein the key frame significance map is utilized by the processor to encode a frame subsequent to the second frame in the sequence of color frames if the frame is within a given tolerance; and
   retaining, in the memory, one of: the second frame, or the color transform of the second frame, as the key frame.

3. The method of claim 2, further comprising:
   obtaining, by the processor, a third frame of the sequence of color frames;
   determining, by the processor, if the third frame is within the given tolerance of the key frame;
   based on determining that the third frame is within the given tolerance, encoding, by the processor, the third frame utilizing the key frame significance map; and
   based on determining that the third frame is not within the given tolerance, creating, by the processor, a significance map for the third frame, wherein creating the significance map for the third frame comprises:
   optionally creating a color transform for a third frame of the sequence of color frames;
   rendering, by a processor, in at least three components, a third frame of the sequence of color frames, wherein each component represents a different color value;
   for each of the at least three components, performing a wavelet transform on the third frame;
   for each of the at least three components, constructing a significant points list and a list of insignificant sets and creating an individual spatial tree of the list of insignificant sets for each component of the at least three components for the third frame;
   for each of the at least three components, initializing the significant points list and the list of insignificant sets;
   searching, by the processor, all of the at least three components to identify a most significant bit in the third frame;
   creating, by the processor, a significance map for the third frame by searching the individual spatial trees for each component of the at least three components, wherein the significance map represents all of the at least three color components;

retaining, in the memory, the significance map as the key frame significance map, wherein the key frame significance map is utilized by the processor to encode a frame subsequent to the third frame in the sequence of color frames if the frame is within a given tolerance; and retaining, in the memory, one of: the third frame, or the color transform of the third frame, as the key frame.

4. The method of claim 1, further comprising: based on encoding the second frame utilizing the key frame significance map, predicting, by the processor, at least one location and at least one sign of the second frame.

5. The method of claim 2, wherein the determining comprises utilizing a correlation metric to compare the second frame to the key frame.

6. The method of claim 5, wherein the correlation metric comprises obtaining a first peak signal to noise ratio for the key frame and a second peak signal to noise ratio for the second frame and comparing the first peak signal to noise ratio to the second peak signal to noise ratio to determine whether the second peak signal to noise ratio is within a predetermined tolerance of the first peak signal to noise ratio.

7. The method of claim 1, further comprising:
obtaining, by the processor, a plurality of frames after the first frame in the sequence of color frames;
determining, by the processor, that a portion of frames of the plurality of frames is within a given tolerance of the key frame; and
concurrently encoding the portion utilizing the key frame significance map to encode the portion.

8. The method of claim 1, further comprising:
prior to the rendering, creating a color transform for the first frame of the sequence of frames.

9. The method of claim 1, wherein the sequence of color frames comprises color digital video.

10. The method of claim 1, wherein the color transform comprises a de-correlating transform.

11. The method of claim 1, wherein the initializing comprises recursive quadrisection of each component of the at least three components.

12. The method of claim 1, wherein creating the significance map comprises creating individual significance maps for each of the at least three components and mixing the individual significance maps of the at least three components, such that higher bit planes in the individual significance maps for each of the at least three components precede lower bit planes in the individual significance maps for each of the at least three components, such that the significance map for the first frame is color-embedded and rate-embedded.

13. A computer system for encoding a sequence of color frames, the computer system comprising:
a memory; and
a processor in communications with the memory, wherein the computer system is configured to perform a method, the method comprising:
obtaining, by a processor, a sequence of color frames;
optionally creating a color transform for a first frame of the sequence of color frames;
rendering, by a processor, in at least three components, a first frame of the sequence of color frames, wherein each component represents a different color value;
for each of the at least three components, performing a wavelet transform on the first frame;
for each of the at least three components, constructing a significant points list and a list of insignificant sets and creating an individual spatial tree of the list of insignificant sets for each component of the at least three components for the first frame;
for each of the at least three components, initializing the significant points list and the list of insignificant sets;
searching, by the processor, all of the at least three components to identify a most significant bit in the first frame;
creating, by the processor, a significance map for the first frame by searching the individual spatial trees for each component of the at least three components, wherein the significance map represents all of the at least three color components;
designating the significance map as a key frame significance map, wherein the key frame significance map is utilized by the processor to encode a frame subsequent to the first frame in the sequence of color frames if the frame is within a given tolerance;
designating one of: the first frame, or the color transform of the first frame, as a key frame; and
transmitting, in an output code stream, an indicator to signify that the first frame is the key frame.

14. The computer system of claim 13, the method further comprising:
obtaining, by the processor, a second frame of the sequence of color frames;
determining, by the processor, if the second frame is within a given tolerance of the key frame, wherein a frame within the given tolerance of the key frame is a correlated frame;
based on determining that the second frame is within the given tolerance, encoding, by the processor, the second frame utilizing the key frame significance map and transmitting, in the output code stream, an indicator bit indicating that the second frame is a correlated frame; and
based on determining that the second frame is not within the given tolerance, creating, by the processor, a significance map for the second frame and transmitting, in the output code stream, an indicator to signify that the second frame is the key frame, wherein creating the significance map for the second frame comprises:
optionally creating a color transform for a second frame of the sequence of color frames;
rendering, by a processor, in at least three components, a second frame of the sequence of color frames, wherein each component represents a different color value;
for each of the at least three components, performing a wavelet transform on the second frame;
for each of the at least three components, constructing a significant points list and a list of insignificant sets and creating an individual spatial tree of the list of insignificant sets for each component of the at least three components for the second frame;
for each of the at least three components, initializing the significant points list and the list of insignificant sets;
searching, by the processor, all of the at least three components to identify a most significant bit in the second frame;
creating, by the processor, a significance map for the second frame by searching the individual spatial trees for each component of the at least three components, wherein the significance map represents all of the at least three color components;
designating the significance map as a key frame significance map, wherein the key frame significance map is utilized by the processor to encode a frame subsequent to the second frame in the sequence of color frames if the frame is within a given tolerance;

designating one of: the second frame, or the color transform of the second frame, as a key frame.

15. The computer system of claim 14, the method further comprising:
    obtaining, by the processor, a third frame of the sequence of color frames;
    determining, by the processor, if the third frame is within a given tolerance of the key frame, wherein a frame within the given tolerance of the key frame is a correlated frame;
    based on determining that the third frame is within the given tolerance, encoding, by the processor, the third frame utilizing the key frame significance map and transmitting, in the output code stream, an indicator bit indicating that the third frame is a correlated frame; and
    based on determining that the third frame is not within the given tolerance, creating, by the processor, a significance map for the third frame and transmitting, in the output code stream, an indicator to signify that the third frame is the key frame, wherein creating the significance map for the third frame comprises:
    optionally creating a color transform for a third frame of the sequence of color frames;
    rendering, by a processor, in at least three components, a third frame of the sequence of color frames, wherein each component represents a different color value;
    for each of the at least three components, performing a wavelet transform on the third frame;
    for each of the at least three components, constructing a significant points list and a list of insignificant sets and creating an individual spatial tree of the list of insignificant sets for each component of the at least three components for the third frame;
    for each of the at least three components, initializing the significant points list and the list of insignificant sets;
    searching, by the processor, all of the at least three components to identify a most significant bit in the third frame;
    creating, by the processor, a significance map for the third frame by searching the individual spatial trees for each component of the at least three components, wherein the significance map represents all of the at least three color components;
    designating the significance map as a key frame significance map, wherein the key frame significance map is utilized by the processor to encode a frame subsequent to the third frame in the sequence of color frames if the frame is within a given tolerance; and
    designating one of: the third frame, or the color transform of the third frame, as a key frame.

16. The computer system of claim 13, the method further comprising:
    obtaining, by the processor, a plurality of frames after the first frame in the sequence of color frames;
    determining, by the processor, that a portion of frames of the plurality of frames is within a given tolerance of the key frame; and
    concurrently encoding the portion utilizing the key frame significance map to encode the portion.

17. The computer system of claim 13, the method further comprising:
    prior to the rendering, creating a color transform for the first frame of the sequence of frames.

18. A computer program product for encoding a sequence of color frames, the computer program product comprising:
    a non-transitory computer readable storage medium readable by a processing circuit and storing instructions for execution by the processing circuit for performing a method comprising:
    obtaining, by a processor, a sequence of color frames;
    optionally creating a color transform for a first frame of the sequence of color frames;
    rendering, by a processor, in at least three components, a first frame of the sequence of color frames, wherein each component represents a different color value;
    for each of the at least three components, performing a wavelet transform on the first frame;
    for each of the at least three components, constructing a significant points list and a list of insignificant sets and creating an individual spatial tree of the list of insignificant sets for each component of the at least three components for the first frame;
    for each of the at least three components, initializing the significant points list and the list of insignificant sets;
    searching, by the processor, all of the at least three components to identify a most significant bit in the first frame;
    creating, by the processor, a significance map for the first frame by searching the individual spatial trees for each component of the at least three components, wherein the significance map represents all of the at least three color components;
    designating, by the processor, the significance map as a key frame significance map, wherein the key frame significance map is utilized by the processor to encode a frame subsequent to the first frame in the sequence of color frames if the frame is within a given tolerance; and
    designating, by the processor, one of: the first frame, or the color transform of the first frame, as a key frame.

19. The computer program product of claim 18, the method further comprising:
    obtaining, by the processor, a plurality of frames after the first frame in the sequence of color frames;
    determining, by the processor, that a portion of frames of the plurality of frames is within a given tolerance of the key frame; and
    concurrently encoding the portion utilizing the key frame significance map to encode the portion.

20. The computer program product of claim 18, the method further comprising: obtaining, by the processor, a second frame of the sequence of color frames;
    determining, by the processor, if the second frame is within a given tolerance of the key frame, wherein a frame within the given tolerance of the key frame is a correlated frame;
    based on determining that the second frame is within the given tolerance, encoding, by the processor, the second frame utilizing the key frame significance map and transmitting, in the output code stream, an indicator bit indicating that the second frame is a correlated frame; and
    based on determining that the second frame is not within the given tolerance, creating, by the processor, a significance map for the second frame and transmitting, in the output code stream, an indicator to signify that the second frame is the key frame, wherein creating the significance map for the second frame comprises:
    optionally creating a color transform for a second frame of the sequence of color frames;
    rendering, by a processor, in at least three components, a second frame of the sequence of color frames, wherein each component represents a different color value;

for each of the at least three components, performing a wavelet transform on the second frame;

for each of the at least three components, constructing a significant points list and a list of insignificant sets and creating an individual spatial tree of the list of insignificant sets for each component of the at least three components for the second frame;

for each of the at least three components, initializing the significant points list and the list of insignificant sets;

searching, by the processor, all of the at least three components to identify a most significant bit in the second frame;

creating, by the processor, a significance map for the second frame by searching the individual spatial trees for each component of the at least three components, wherein the significance map represents all of the at least three color components;

designating, by the processor, the significance map as a key frame significance map, wherein the key frame significance map is utilized by the processor to encode a frame subsequent to the second frame in the sequence of color frames if the frame is within a given tolerance; and designation, by the processor, one of: the second frame, or the color transform of the second frame, as a key frame.

* * * * *